(12) United States Patent
Goering et al.

(10) Patent No.: US 10,094,505 B2
(45) Date of Patent: Oct. 9, 2018

(54) HEATABLE LINE PIPE AND A METHOD FOR PRODUCING THE HEATABLE PIPE

(71) Applicants: Rainer Goering, Borken (DE); Michael Boeer, Olfen (DE); Juergen Franosch, Marl (DE); Joerg Westmeier, Krefeld (DE); Otfried Schwarzkopf, Kuerten (DE); Daniel De Beer, Engelskirchen (DE)

(72) Inventors: Rainer Goering, Borken (DE); Michael Boeer, Olfen (DE); Juergen Franosch, Marl (DE); Joerg Westmeier, Krefeld (DE); Otfried Schwarzkopf, Kuerten (DE); Daniel De Beer, Engelskirchen (DE)

(73) Assignees: EVONIK DEGUSSA GmbH, Essen (DE); VOSS AUTOMOTIVE GmbH, Wipperfuerth (DE)

( * ) Notice: Subject to any disclaimer, the term of this patent is extended or adjusted under 35 U.S.C. 154(b) by 1059 days.

(21) Appl. No.: 13/892,534

(22) Filed: May 13, 2013

(65) Prior Publication Data
US 2013/0299030 A1    Nov. 14, 2013

(30) Foreign Application Priority Data

May 14, 2012    (DE) .......................... 10 2012 208 020

(51) Int. Cl.
*H05B 6/10*    (2006.01)
*F16L 53/00*    (2018.01)
(Continued)

(52) U.S. Cl.
CPC .......... *F16L 53/008* (2013.01); *B29C 47/025* (2013.01); *B29C 47/065* (2013.01);
(Continued)

(58) Field of Classification Search
CPC ... B29C 47/0023; B29C 47/02; B29C 47/021; B29C 47/025; B29C 47/065;
(Continued)

(56) References Cited

U.S. PATENT DOCUMENTS 4,581,521 A * 4/1986 Grise ........................ H05B 3/58
219/528
6,090,459 A * 7/2000 Jadamus ................. F16L 9/125
428/36.4

(Continued)

FOREIGN PATENT DOCUMENTS

DE            39 00 821 C1    4/1990
DE    10 2011 018 243 A1    10/2012
(Continued)

OTHER PUBLICATIONS

European Search Report dated Jul. 4, 2013, in Patent Application No. 13166622.4 (with English Translation of Categories of Cited Documents).

(Continued)

*Primary Examiner* — Dana Ross
*Assistant Examiner* — Brandon Harvey
(74) *Attorney, Agent, or Firm* — Oblon, McClelland, Maier & Neustadt, L.L.P.

(57) ABSTRACT

A heatable line pipe useful for diesel fuel systems and fuel cell systems is provided. The heatable line pipe comprises in order from an inside of the pipe: a) an electrically insulating inner layer; b) a first electrically conductive layer; c) at least two current leads wound spirally around the first electrically conductive layer; d) a second electrically conductive layer over the at least two current leads forming a surface; and e) an outer cladding of an electrically insulating plastic material. The thickness of the second electrically conductive layer is 0.1 to 1.5 mm, and the at least two current leads form (Continued)

wave peaks in the surface of the second electrically conductive layer. The line pipe has the advantage that a fall in heating performance over the lifetime is effectively prevented.

9 Claims, 2 Drawing Sheets

(51) Int. Cl.
| | | |
|---|---|---|
| B29C 47/06 | (2006.01) | |
| B29C 47/02 | (2006.01) | |
| F16L 53/38 | (2018.01) | |
| B29C 47/00 | (2006.01) | |
| F01N 3/20 | (2006.01) | |

(52) U.S. Cl.
CPC .......... *F16L 53/38* (2018.01); *B29C 47/0023* (2013.01); *B29K 2995/0005* (2013.01); *B29K 2995/0007* (2013.01); *F01N 3/2066* (2013.01); *F01N 2610/02* (2013.01); *F01N 2610/10* (2013.01)

(58) Field of Classification Search
CPC ............ B29K 2995/0005; F16L 53/005; F16L 53/008; F24H 1/101; F24H 1/102; F24H 1/105; F24H 1/142; F24H 1/162; F24H 9/2028; H05B 3/58
USPC ........................................................ 219/535
See application file for complete search history.

(56) References Cited

U.S. PATENT DOCUMENTS

| | | |
|---|---|---|
| 6,316,537 B1 | 11/2001 | Baumann et al. |
| 6,656,997 B2 | 12/2003 | Baumann et al. |
| 2003/0052114 A1* | 3/2003 | Ek ........................... H05B 3/36 219/213 |
| 2004/0007279 A1* | 1/2004 | Yamaguchi ............. B29C 65/20 138/125 |
| 2005/0083638 A1* | 4/2005 | Warren .............. B60H 1/00557 361/600 |
| 2010/0126986 A1* | 5/2010 | Gunzing ............... F16L 53/008 219/643 |
| 2012/0275774 A1 | 11/2012 | Goering et al. |
| 2012/0279577 A1 | 11/2012 | Goering et al. |

FOREIGN PATENT DOCUMENTS

| | | |
|---|---|---|
| EP | 0 306 638 A1 | 3/1989 |
| EP | 0 312 204 A2 | 4/1989 |
| JP | 01-132089 A | 5/1989 |
| WO | WO 2006/090182 A1 | 8/2006 |
| WO | WO 2006/097765 A1 | 9/2006 |
| WO | WO 2009/052849 A1 | 4/2009 |
| WO | WO 2009/063980 A1 | 5/2009 |

OTHER PUBLICATIONS

U.S. Appl. No. 13/457,634, filed Apr. 27, 2012, US2012/0275774 A1, Goering, et al.
U.S. Appl. No. 13/463,061, filed May 3, 2012, US2012/0279577 A1, Goering, et al.
Office Action dated Nov. 21, 2016 in Japanese Patent Application No. 2013-101988.

* cited by examiner

HEATABLE LINE PIPE AND A METHOD FOR PRODUCING THE HEATABLE PIPE

CROSS REFERENCE TO RELATED APPLICATIONS

This applications claims priority to German Patent Application No. 102012208020.1, filed May 14, 2012, the disclosure of which is incorporated herein by reference in its entirety.

BACKGROUND OF THE INVENTION

The present invention relates to a heatable pipe for storing or conveying a liquid or gaseous medium that is to be heated, wherein at least two current leads are embedded as electrodes in a layer of an electrically conductive moulding composition. The present invention also relates to a method for producing the heatable pipe.

A need which frequently arises when transporting liquid or gaseous media through a pipe is to maintain the temperature of the medium above a defined minimum temperature. Pipes of this kind are typically constructed from plastics materials; they must be able to be heated in a way which is adapted on the one hand to the medium and on the other hand to the pipe material. Examples thereof are lines for diesel fuel, where the flocculation of paraffin constituents in winter temperatures must be prevented; lines for fuel cell systems; and selective catalytic reduction (SCR) lines.

Diesel vehicles possess a catalytic converter which by means of selective catalytic reduction (SCR) uses an aqueous urea solution to cause denoxing of the exhaust gases, to lower the emissions of nitrogen oxides. However, the aqueous urea solution that is used, and which the industry consistently refers to as AdBlue®, freezes at temperatures of $-11°$ C. and below. At these temperatures, therefore, the transport of the urea solution from the reservoir container to the catalytic converter is no longer ensured; consequently, the denoxing of the exhaust gas is no longer possible either. To prevent the AdBlue® freezing even at low temperatures, the lines must be heatable and must ensure thawing of the AdBlue® within a period of around 10 minutes.

Various methods for heating such lines have been employed. In one method standard resistance heaters are wound around the fluid pipe (WO 2009/052849). This arrangement, however, is susceptible to faults; moreover, the resistance of the wire winding must be adapted to the length of the line and to the ambient and installation conditions.

An elegant option for heating such a line is described in WO 2006/097765, WO 2006/090182, DE 39 00 821 C1 and EP 0 306 638 A1. The arrangement in each of these descriptions involves a multi-layer pipe containing two leads, which run along the pipe and are embedded, offset from one another by 180°, in a conductive polymer layer. The flow of current from one lead to the other produces heating in the conductive layer. This arrangement has considerable technical and economic advantages over the simple resistance heating. However, it does require the direct embedding of the leads in the plastics material and hence electrical contact between matrix and lead. The precise introduction of the stranded cord or wire into this layer, though, is very difficult, and becomes more and more problematic as diameters reduce. Furthermore, lines of this kind exhibit a deterioration in flexibility. The risk exists, moreover, of the contact between the conductive moulding composition and the leads undergoing change in the course of thermoforming, in the course of installation of the line in a vehicle, for example, with narrow bending radii (flexural load), on multiple freezing and re-thawing (low-temperature deformation), and in prolonged service. A consequence of such change is a change in the passage of electrons from the wire or stranded cord to the conductive moulding composition, and this, of course, has an adverse effect on the heatability of the line.

Better line flexibility is obtained with spiral winding of the electrodes. EP 0 312 204 A2 discloses a heatable line where two electrodes are wound spirally around the pipe and are embedded in an electrically conducting layer. The embedding is brought about by first coating the electrodes with the conductive moulding composition; the electrodes are subsequently wound around the inner pipe and then clad with the conductive moulding composition using a crosshead die. In this way, the contact resistance between the electrodes and the conductive layer is minimized. The process of embedding, however, is complicated. Coating of the electrodes requires a readily flowing, conductive moulding composition, whereas the moulding composition for the cladding must be applied as a relatively thick layer. EP 0 312 204 A2 gives the surface of the conductive cladding layer a smooth cylinder shape; the figures therein also show that the lead wires do not show through externally.

The object of the present invention is that of avoiding the disadvantages of the prior art and in particular of providing a line pipe with which on the one hand there is effective and durable attachment between the electrodes and the electrically conductive polymer matrix, with low contact resistance as a result of this, and on the other hand the position of the electrodes is easily detectable, allowing them to be contacted at the desired points via a coupling and fed with current.

SUMMARY OF THE INVENTION

This and other objects have been achieved by the present invention, the first embodiment of which includes a heatable line pipe, comprising, in order from an inside of the pipe:

a) an electrically insulating inner layer;
b) a first electrically conductive layer;
c) at least two current leads wound spirally around the first electrically conductive layer;
d) a second electrically conductive layer over the at least two current leads; and
e) an outer cladding of an electrically insulating plastic material forming a surface;

wherein a thickness of the second electrically conductive layer is 0.1 to 1.5 mm, and the at least two current leads form wave peaks in the outer cladding surface.

In a further embodiment of the present invention the height of the wave peaks above the outer cladding surface is from 0.1 to 1.2 mm.

In another embodiment the present invention includes a method for producing the heatable line pipe, the method comprising:

i) extruding a two-layer pipe having an electrically insulating inner layer and a first electrically conductive layer over the inner layer;

ii) winding at least two current leads spirally around the first electrically conductive layer;

iii) applying a second layer having a thickness of 0.1 to 1.5 mm of an electrically conductive moulding composition by extrusion over the spirally wound current leads; and iv) applying an outer cladding of an electrically insulating plastic material over the second electrically conductive layer to obtain a surface having wave peaks formed by the at least two current leads.

In a further embodiment of the method the present invention includes after ii), heating the extruded two-layer pipe with the spiral wound current leads to soften a surface of the first electrically conductive layer closest to the current leads and pressing and binding the current leads in the softened surface.

DETAILED DESCRIPTION OF THE INVENTION

Figure 1:
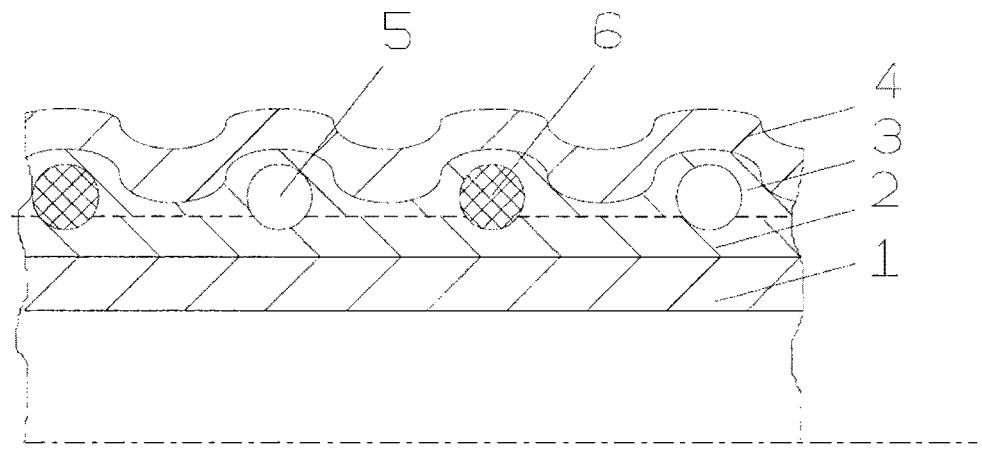
FIG. 1 shows a schematic diagram of one embodiment of the present invention.

The heatable line pipe, according to the present invention, comprises, in order from an inside of the pipe:
a) an electrically insulating inner layer;
b) a first electrically conductive layer;
c) at least two current leads wound spirally around the first electrically conductive layer;
d) a second electrically conductive layer over the at least two current leads; and
e) an outer cladding of an electrically insulating plastic material forming a surface;
wherein a thickness of the second electrically conductive layer is 0.1 to 1.5 mm, and the at least two current leads form wave peaks in the outer cladding surface.

The heatable line pipe is obtained by a method for producing a heatable line pipe, wherein i) a two-layer pipe having an electrically insulating inner layer and a first electrically conductive layer is extruded,
ii) at least two current leads are wound spirally as electrodes around the first electrically conductive layer,
iii) the first electrically conductive layer with the current leads applied by winding is optionally heated, so that it softens on the surface and the current leads are pressed in and bound in,
iv) a second layer of an electrically conductive moulding composition is applied by extrusion, the thickness of this layer being 0.1 to 1.5 mm, preferably 0.2 to 1 mm and more preferably 0.2 to 0.8 mm, and
v) an outer cladding of an electrically insulating plastic material is applied.

The embedding of the current leads between the two electrically conductive layers reduces the electrical contact resistance.

The outer diameter and also the wall thickness are in principle not subject to any restrictions; they are dependent solely on the intended application. Generally, however, outer diameters in the range from 2.5 to 50 mm, preferably from 3 to 30 mm and more preferably from 4 to 25 mm are preferred, while the wall thicknesses are preferably in the range from 0.8 to 4 mm, more preferably in the range from 1 to 3 mm and especially preferably in the range from 1 to 2.5 mm. These figures take no account of the wave peaks originating from the current leads showing through on the outside. Exemplary embodiments, in each case expressed as outer diameter×wall thickness, may be as follows:

for SCR lines: 3 mm×1 mm, 4 mm×1 mm, 5 mm×1 mm, 8 mm×1 mm or 12 mm×1.5 mm;
for diesel lines: 6 mm×1 mm, 8 mm×1 mm, 10 mm×1.5 mm or 25 mm×2.5 mm;
lines for gas supply of fuel cells in vehicles: 4 mm×1 mm, 5 mm×1 mm, 8 mm×1 mm, 10 mm×1 mm or 12 mm×1.5 mm.

In the context of these exemplary embodiments, however, all of the ranges in between are also equally possible; accordingly, the entire ranges are disclosed.

In further embodiments, the outer cladding may be foamed for thermal insulation, and the wall thickness and the outer diameter may in certain cases also be higher. In such cases the wall thickness may easily be up to about 15 mm.

In the simplest embodiment, the electrically insulating inner layer is a single-layer. However, it may also be multi-layer, in which case it may consist of a plurality of sublayers such as, for example, an innermost sublayer and an adhesion promoter sublayer. Also possible are embodiments with even more sublayers, as for example with an innermost sublayer, an adhesion promoter sublayer, a sublayer which functions as a barrier layer against the medium to be conveyed or components in it, and an adhesion promoter layer for attachment to the first electrically conductive layer.

The insulating inner layer preferably possesses a thickness of 0.1 to 1.5 mm, more preferably of 0.1 to 1 mm and especially preferably of 0.15 to 0.5 mm. These ranges also include the embodiment in which the insulating inner layer consists of a plurality of sublayers.

The two-layer pipe extruded in i), having an electrically insulating inner layer and a first electrically conductive layer, may preferably be produced in a single process step by coextrusion. However, it may be possible to first extrude a pipe which consists only of the electrically insulating inner layer, and then to apply the electrically conductive layer to said pipe, by means, for example, of a crosshead die.

The current leads used as electrodes may be wires, stranded cords or ribbons, for example. They may consist of any sufficiently conductive and sufficiently robust metal, such as, for example, copper, silver or aluminium. They may have been given a media-resistant coating, preferably of tin or nickel. In operation, the electrodes are given different polarities; the potential difference between the electrodes then leads to a flow of current through the two electrically conductive layers, producing heat.

The thickness of the current leads may preferably be in the range from 0.1 to 2 mm, more preferably in the range from 0.2 to 1 mm and especially preferably in the range from 0.3 to 0.8 mm. In the case of current leads which do not possess a circular cross section, as in the case of flat stranded cords or ribbons, for instance, the lowest thickness is considered. The current leads are wound under pre-tension; this pre-tension is preferably at least 5 N, more preferably at least 10 N and especially preferably at least 15 N. The pre-tension not only seats the current leads securely but also has the effect, in the optional subsequent step, that the current leads, when the first electrically conductive layer is heated, are pressed into this layer.

The current leads are wound in such a way that the two leads with different polarities possess a distance from one another preferably in the range from 2 to 20 mm and more preferably in the range from 6 to 16 mm. The flow of current within the electrically conductive layers, in the case of perpendicular lead distances which are smaller than half the circumference of the conductive layers, is direct in this case, with axial and radial components, in the perpendicular direction between the current leads.

The current leads may optionally be fixed to the pipe with suitable adhesion promoters or adhesives. Mechanical fixing by means of threads or tapes may also be possible.

The heating of the pipe may be carried out according to any suitable technique, including, but not limited to IR radiation, radiofrequency heating or microwave heating, inductively, or by hot gas. In one preferred embodiment heating may be accomplished by flaming, which also may improve the adhesion between the first and second electrically conductive layers. Where the second electrically conductive layer is applied by extrusion, the heat may also be introduced in the form of the heat content of the melt; a prerequisite for this, however, is that the applied melt is at a sufficiently high temperature to bring about softening of the surface of the first electrically conductive layer. In this embodiment the winding of the current leads and the application of the second conductive layer are coincident.

When the current leads are pressed in and bound in, the metal of the wire or of the stranded cord is surrounded by the flow of melt and wetted. Following solidification, the matrix of the moulding composition adheres to the metal. This minimizes the electrical contact resistance still further.

When the second electrically conductive layer is applied, the melt may be extruded on preferably via a crosshead die or by extrusion wrapping.

In application of the outer cladding, an electrically insulating plastics material may likewise be extruded using, for example, a crosshead die or by a multi-layer extrusion process.

The method may be simplified by coincidently extruding the second layer of an electrically conductive moulding composition and also the outer cladding together, as a two-layer assembly. Since, however, there is frequently no need for any frictional or fusional adhesion between the second electrically conductive layer and the outer cladding, an alternative option may be to push a smooth pipe or a corrugated pipe as outer cladding over the second electrically conductive layer of the pipe.

The material of the inner layer and of the two electrically conductive layers is a thermoplastic moulding composition. The moulding composition may be constructed on the basis of, for example, polyamides, polyolefins, fluoropolymers or polyurethane. The term "on the basis of" here and also elsewhere expresses the fact that the moulding composition is composed to an extent of at least 40 wt. %, preferably at least 50 wt. % and more preferably at least 60 wt. % of the stated polymer.

The polyamide may be obtained from a combination of diamine and dicarboxylic acid, from an ω-aminocarboxylic acid or from the corresponding lactam. In principle it is possible to use any polyamide, an example being PA6 or PA66. In one preferred embodiment the monomer units of the polyamide contain on average at least 8, at least 9 or at least 10 C atoms. In the case of polyamides which derive from mixtures of lactams, the number describes the arithmetic average. In the case of a combination of diamine and dicarboxylic acid, the arithmetic average of the C atoms of diamine and dicarboxylic acid in this preferred embodiment must be at least 8, at least 9 or at least 10. Examples of suitable polyamides include: PA610 (prepared from hexamethylenediamine [6 C atoms] and sebacic acid [10 C atoms], the average of the C atoms in the monomer units here thus being 8), PA88 (prepared from octamethylenediamine and 1,8-octanedioic acid), PA8 (prepared from caprylolactam), PA612, PA810, PA108, PA9, PA613, PA614, PA812, PA128, PA1010, PA10, PA814, PA148, PA1012, PA11, PA1014, PA1212 and PA12. The preparation of the polyamides is conventionally known. It is of course also possible to use copolyamides based thereon, in which case monomers such as caprolactam may optionally also be used.

As polyamide it is also possible advantageously to use a semi-aromatic polyamide whose dicarboxylic acid component originates to an extent of 5 to 100 mol % from aromatic dicarboxylic acids having 8 to 22 C atoms and that possesses a crystallite melting point of at least 260° C., preferably of at least 270° C. and more preferably of at least 280° C. Polyamides of these kinds are referred to typically as PPA. They are prepared from a combination of diamine and dicarboxylic acid, optionally with addition of an ω-aminocarboxylic acid or of the corresponding lactam. Examples of suitable types include PA66/6T, PA6/6T, PA6T/MPMDT (MPMD stands for 2-methylpentamethylenediamine), PA9T, PA10T, PA11T, PA12T, PA14T, and also copolycondensates of these latter types with an aliphatic diamine and an aliphatic dicarboxylic acid or with an ω-aminocarboxylic acid and/or a lactam.

The polyamide may also be a polyether ester amide or a polyether amide. Polyether amides are described, for example, in DE-A 30 06 961, and contain a polyetherdiamine as comonomer. Suitable polyetherdiamines are obtainable by converting the corresponding polyetherdiols by reductive amination or coupling with acrylonitrile with subsequent hydrogenation (e.g. EP-A-0 434 244; EP-A-0 296 852). They generally possess a number-average molar mass of 230 to 4000; their fraction within the polyether amide is preferably 5 to 50 wt. %.

Commercially available polyetherdiamines starting from propylene glycol are available commercially as JEFFAMIN® D types from Huntsman. Also highly suitable are polyetherdiamines starting from 1,4-butanediol or 1,3-butanediol, or polyetherdiamines of mixed construction, as for instance with random or with blockwise distribution of the units originating from the diols.

It may also be possible, subject to the proviso of sufficient compatibility, to use mixtures of different polyamides. Compatible polyamide combinations are conventionally known and include the combinations PA12/PA1012, PA12/PA1212, PA612/PA12, PA613/PA12, PA1014/PA12 and PA610/PA12, and also corresponding combinations with PA11. In case of doubt, compatible combinations may be ascertained by means of routine tests.

In one preferred embodiment a mixture of 30 to 99 wt. %, more preferably 40 to 98 wt. % and especially preferably 50 to 96 wt. % of polyamide and 1 to 70 wt. %, more preferably 2 to 60 wt. % and especially preferably 4 to 50 wt. % of polyether ester amide and/or polyether amide may be used. Polyether amides are preferred here.

Besides polyamide, the moulding composition may optionally include further components such as, for example, impact modifiers, other thermoplastics, plasticizers and other customary adjuvants. The polyamide forms the matrix of the moulding composition.

The polyolefin may primarily be a polyethylene, more particularly a high-density polyethylene (HDPE), or an isotactic or syndiotactic polypropylene. The polypropylene may be a homopolymer or a copolymer, for example with ethylene or 1-butene as comonomer, and both random and block copolymers may be used. Furthermore, the polypropylene may also have been impact-modified, in accordance with the state of the art, for example, by ethylene-propylene rubber (EPM) or EPDM. The syndiotactic polystyrene that can likewise be used in accordance with the invention may be prepared by metallocene-catalysed polymerization of styrene as conventionally known.

The fluoropolymer may be, for example, a polyvinylidene fluoride (PVDF), an ethylene-tetrafluoroethylene copolymer (ETFE), an ETFE modified by means of a ter component such as propene, hexafluoropropene, vinyl fluoride or vinylidene fluoride, for example (for example EFEP), an ethylene-chlorotrifluoroethylene copolymer (E-CTFE), a polychlorotrifluoroethylene (PCTFE), a chlorotrifluoroethylene-perfluoroalkyl vinyl ether-tetrafluoroethylene copolymer (CPT), a tetrafluoroethylene-hexafluoropropene copolymer (FEP) or a tetrafluoroethylene-perfluoroalkyl vinyl ether copolymer (PFA). Also suitable are copolymers based on vinylidene fluoride that contain up to 40 wt. % of other monomers such as, for example, trifluoroethylene, chlorotrifluoroethylene, ethylene, propene and hexafluoropropene.

Barrier layers, where present, may consist for example of ethylene-vinyl alcohol copolymers (EVOH), polyethylene naphthalate, polybutylene naphthalate or polyphenylene sulphide (PPS).

The first and second electrically conductive layers may advantageously be of the same moulding composition. This ensures that good inter-layer adhesion may be achieved. Within the scope of the present invention different moulding compositions, subject to the proviso that they adhere well to one another, may be employed.

The electrical conductivity of the polymeric moulding composition may be obtained as conventionally known, such as for example, by addition of conductive carbon black, graphite powder and/or graphite fibrils (carbon nanotubes). The volume resistivity of this polymeric moulding composition may be in the range from $10^{-3}$ to $10^{10}$ Ωm, preferably in the range from $10^{-2}$ to $10^{8}$ Ωm, more preferably in the range from $10^{-1}$ to $10^{7}$ Ωm and especially preferably in the range from $10^{0}$ to $10^{6}$ Ωm, as measured in accordance with DIN IEC 60093 when the volume resistivity is $10^{4}$ Ωm and above, and in accordance with EN ISO 3915 when the volume resistivity is below $10^{4}$ Ωm.

In order to improve the electrical conductivity and/or to lower the percolation threshold, the conductive polymeric moulding composition may further comprise a salt with a non-metallic cation, a dispersant based on esters or amides, or a mixture of both. Suitable salts with a non-metallic cation, dispersants based on esters or amides, and the amounts thereof that are used are disclosed in the German patent application with the application file reference 102 01 0043470.1 of May 11, 2010; the relevant disclosure content of that patent application is incorporated herein by reference.

In many applications, for example in the case of motor vehicle and commercial vehicle systems, the available voltage is not constant. Nevertheless, the necessary heating performance must be ensured in the case of a low voltage. At high voltages, in contrast, the maximum permissible temperature must not be exceeded. The electrically conductive moulding composition may preferably be designed to exhibit a positive temperature coefficient (PTC) effect. With such design, as the temperature rises, there is an increase in the resistance of the moulding composition. This effect may be produced especially when using conductive carbon black and/or graphite as the conductive additive. The effect represents an intrinsic safety feature, since with rising voltage it counters any excess temperature increase on the part of the line. This is important in order not to go above an ignition point, a flash point or a decomposition temperature of the medium to be transported, or not to cause thermal damage to the line material itself.

The method of the invention possesses a further decisive advantage, in that the conductivity of the first electrically conductive layer may be measured. Depending on the conductivity of this layer, the thickness of the second electrically conductive layer may be varied when applied, in order to acquire the pipe conductivity necessary for heating. Hence changes in the conductivity of the moulding composition, which cannot be ruled out and which may originate, for example, from differences in the carbon black batch used or from metering fluctuations in the course of compounding, for example, may be compensated. As the conductive layers increase in thickness, the conductivity of the system goes up. Another way of changing the conductivity of the system includes varying the distance of the current leads.

As a result of the inventively low thickness of the second electrically conductive layer, the current leads show through clearly on the pipe surface as a wave peak, after application of the second conductive layer. The wave peak effect is a design element of the present invention and as a result, the position of the leads may be easily ascertained. They can then be easily detected and exposed at the positions at which they have to be contacted in order to supply them with current via a coupling. The difference between wave peak and wave valley is preferably 0.1 to 1.2 mm, more preferably 0.2 to 0.8 mm and especially preferably 0.3 to 0.5 mm.

Figure 2:
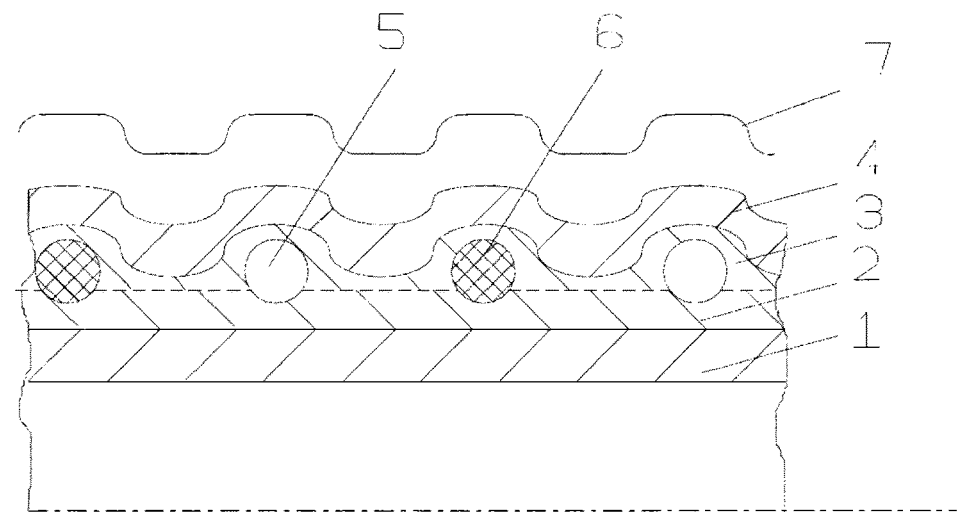
FIG. 2 shows a schematic diagram of a second embodiment of the present invention.
Figure 3:
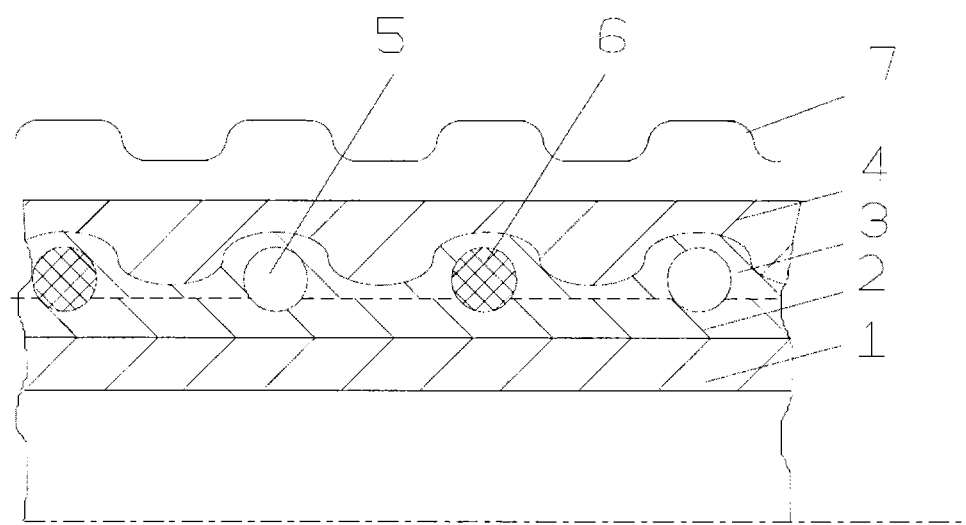
FIG. 3 shows a schematic diagram of a third embodiment of the present invention.

This wavelike contour possesses further advantages. In one embodiment it serves as a frictional contact for attachment contours still to be applied. If an outer cladding of an electrically insulating moulding composition is applied using a crosshead die, the cladding is fixed by the contour even in the absence of any inter-layer adhesion. In this way the outer cladding can be easily removed at the locations at which the current leads must subsequently be exposed and contacted. In order to facilitate this structure, the outer cladding may be notched or perforated, at least at the corresponding locations, so that the layer can be torn into or torn through and removed by easy incision. A corresponding embodiment is shown in FIG. 1. In that figure an electrically insulating inner layer 1 is followed directly by a first electrically conductive layer 2, a second electrically conductive layer 3 and an outer cladding 4. The outer cladding 4 may be applied, for example, via a crosshead die in a parison process as is conventionally known. The adhesion between the layer 3 and the cladding 4 may optionally be low or else may be absent entirely; frictional contact produces sufficient fixing. Embedded in the two electrically conductive layers 2 and 3 is a spiral-wound lead pair 5 and 6, which in operation possess opposite polarity. Adjoining the outer cladding 4 in FIG. 2 is a further outer cladding 7, which is applied, for example, via a crosshead die and shaped via a corrugated pipe take-off. The wave peaks in the cladding 7 need not have the same position, and more particularly need not have the same distance from one another, as the wave peaks in the cladding 4. Another embodiment is shown in FIG. 3, wherein the outer cladding 4 is applied by means of pressure processes, resulting in a smooth surface. It is followed by a further outer cladding 7, subject to the same comments as for the embodiment shown in FIG. 2.

In a further embodiment, the resultant wave peaks may serve as "support points" for a smooth pipe or corrugated pipe slipped over them; this outer cladding is in that case fixed by force contact connection. The spaces that develop in between in this case, especially in the wave valleys, contain insulating air or, generally, included insulating gas, and at the same time allow the included gas to circulate helically, thereby producing uniform thermal conditioning of the line by means of the radial and axial gas exchange. At the same time, as a result of the unfilled wave valleys, a saving in material and hence also in weight is achieved. A pipe slipped over can also be shrunken to fit; it may then be additionally fixed by frictional contact.

In all of these embodiments, the outer cladding may consist either of compact material or of foamed material. With foamed material, the outer cladding is preferably closed-pored. It may additionally be enveloped with a thin outer layer or outer skin. Such construction provides utility when the outer cladding consists of open-pored foam, in order to prevent water, oil, dirt or the like being taken up into the structure. Suitable materials are, for example, moulding compositions based on polyamides, polyolefins, fluoropolymers or polyurethane, and also thermoplastic elastomers.

The heated line pipe according to the claims is easy to produce and easy to assemble and install. It has the advantage, moreover, that a drop in the heating performance over its lifetime can be effectively prevented.

The invention also relates to utility of the heatable line pipe for producing an SCR line, a line for diesel fuel or a line for fuel cell systems. For that purpose the line pipe must also be assembled—that is, completed to give a fully functional line, through the attachment, for example, of connecting elements, connectors, clips, mounts, cables, plugs or gaskets, and also by thermoforming of the line, in order to give the line a three-dimensionally winding form as dictated structurally.

Numerous modifications and variations of the present invention are possible in light of the above teachings. It is therefore to be understood that within the scope of the appended claims, the invention may be practiced otherwise than as specifically described herein.

The invention claimed is:

1. A heatable line pipe, comprising, in order from an inside of the pipe:
   a) an electrically insulating inner layer;
   b) a first electrically conductive layer;
   c) at least two current leads wound spirally around the first electrically conductive layer such that a distance from one another is from 2 to 20 mm;
   d) a second electrically conductive layer over the at least two current leads forming a surface; and
   e) an outer cladding of an electrically insulating plastic material;

wherein
   the at least two current leads are embedded and bound in the first and second electrically conductive layers,
   a thickness of the second electrically conductive layer is 0.1 to 1.5 mm, and
   the at least two current leads form wave peaks having a difference between a wave peak and a wave valley of from 0.1 mm to 1.2 mm in the surface of the second electrically conductive layer.

2. The heatable line pipe according to claim 1, wherein the electrically insulating inner layer comprises a plurality of sublayers.

3. The heatable line pipe according to claim 1, wherein the at least two current leads are wires, stranded cords or ribbons.

4. The heatable line pipe according to claim 1, wherein a thickness of the at least two current leads is from 0.1 to 2 mm.

5. The heatable line pipe according to claim 1, wherein a difference of the wave peak and wave valley is from 0.3 mm to 0.5 mm.

6. The heatable line pipe according to claim 1, wherein the first and second electrically conductive layers comprise at least one electrically conductive component selected from the group of components consisting of conductive carbon black, conductive graphite powder and conductive graphite fibrils.

7. The heatable line pipe according to claim 1, wherein a volume resistivity of the first and second electrically conductive layers is from $10^{-3}$ to $10^{10}$ $\Omega$m,
   wherein when the volume resistivity is from $10^4$ to $10^{10}$ $\Omega$m, measurement of the volume resistivity is in accordance with DIN IEC 60093 and when the volume resistivity is from $10^{-3}$ to $10^4$ $\Omega$m measurement of the volume resistivity is in accordance with EN ISO 3915.

8. The heatable line pipe according to claim 1, wherein the outer cladding is an extruded layer and the outer cladding comprises a wave contour matching the wave peaks of the second electrically conductive layer.

9. The heatable line pipe according to claim 1, wherein the outer cladding is a smooth pipe or corrugated pipe fixed by force contact connection with the wave peaks.

* * * * *